United States Patent Office 3,296,078
Patented Jan. 3, 1967

3,296,078
COMPRESSED FACE POWDER CAKE COMPOSITION
Anne Kaye, 115 Eastern Parkway, Brooklyn, N.Y. 11238, and Herman J. Amsterdam, 587 Montgomery St., Brooklyn, N.Y. 11225
No Drawing. Continuation of application Ser. No. 755,870, Aug. 19, 1958. This application Mar. 14, 1962, Ser. No. 179,782
16 Claims. (Cl. 167—92)

The application is a continuation of application Serial No. 755,870, filed August 19, 1958, now abandoned.

This invention relates to compressed face powders and it has particular relation to cosmetic compositions adapted to be used in the form of a "cake" in compacts.

The main object of the present invention is to provide cosmetic compositions of the above mentioned type which can be prepared substantially without the use of water or aqueous solutions, and without emulsifying agents, and in their compressed cake form transfer readily to a wet puff and can be applied easily and conveniently, to form a flexible and resistant film on the skin.

We have found that by intimately mixing a mixture of filler or texture powders of the type described hereinafter with a mixture of components having lubricating value and with preserving or antiseptic agents, substantially in the absence of water and emulsifying agents a face powder composition can be obtained, which can be compressed in conventional manner to a face powder cake having the valuable characteristics described hereinafter.

We have found that in carrying out the present invention a combination of the ingredients described hereinafter must be used and these ingredients must be applied in the proportions described hereinafter in order to obtain a powder cake having the desired properties.

In carrying out our invention, texture materials, a wetting agent, titanium dioxide, zinc stearate, and inorganic pigments, are combined by mixing in the manner described hereinafter with lubricating ingredients, preserving and antiseptic agents and perfume and the mixture resulting in the form of powder is then compressed to cakes in conventional manner.

The following examples describe specific embodiments of and best modes for carrying out the invention to which the invention is not limited.

*Example 1*

A composition embodying the present invention is prepared from the following ingredients:

| | Percent by weight |
|---|---|
| Talcum | 61.25 |
| Sodium lauryl sulfate | 0.75 |
| Titanium dioxide | 7.50 |
| Zinc stearate | 11.25 |
| Inorganic pigments | 1.00 |
| Mineral oil | 4.50 |
| Spermaceti | 3.00 |
| Cetyl alcohol | 1.50 |
| Lanolin | 1.00 |
| Glycerin | 7.50 |
| Hexachlorophene | 0.25 |
| Alkyl dimethyl benzyl ammonium chloride—50% | 0.20 |
| Methyl-para-hydroxy-benzoate | 0.09 |
| Propyl-para-hydroxy-benzoate | 0.09 |
| Perfume | 0.12 |
| | 100.00 |

In preparing a composition from the above named ingredients all of the dry powdered nonmedicated materials (talcum, sodium lauryl sulfate, titanium dioxide, zinc stearate, and inorganic pigments) are incorporated in a conventional ribbon mixer and continuously mixed for about an hour. The above mentioned medicating materials are thoroughly mixed and are then introduced into said mixer and continually mixed therein with the mixture of nonmedicated materials for about 2 hours. The resulting mixed batch is removed from the ribbon mixer and passed through a micro pulverizer using a number 0.013 screen. During this step the temperature of the material must not be permitted to rise more than 10° C. above room temperature. The batch is then allowed to cool to room temperature, e.g., 15–22° C., and once again passed through the micro pulverizer under the same conditions as above. The mineral oil, spermaceti, lanolin and glycerin are then mixed under heating to a liquid mixture, sprayed into the dry batch and the latter is now mixed in a ribbon mixer for about ½ hour. The batch is then removed from the ribbon mixer, passed through a comminuter and once again passed through a pulverizer using a $9/16$ screen, whereby the temperature of the material is not permitted to rise by more than 10° C. above room temperature, i.e., to less than 37° C. The batch is now allowed to cool to room temperature and once again passed through the micro pulverizer using a number 0.027 screen. The material is allowed to cool to room temperature and passed through a number 40 mesh screen, no heat being permitted to be generated during this final screen process. The material thus obtained is filled into "cake pans" which may be made of aluminum, vinyl resin coated tin plate, glass or plastic and are first sprayed on their interior surface with a thin, e.g., 30%, solution in water of "Clarpic 80" and allowed to dry. The powder filled pans are put into a press and the air is squeezed out of the powder in the pans. According to conventional procedure, in order to convert the powder into cake, e.g., a pressure of about 10 lbs. per square inch or the conventional pressure of 40–50 lbs. per square inch is then applied to the powder in the pan by means of a suitably shaped steel die which is provided with a covered rubber dam.

Further embodiments of the compositions according to the present invention are illustrated by the following examples, it being understood that the figures are percent by weight and the process used in these examples is substantially the same as described in the above Example 1.

In preparing the compositions according to the present invention, other ingredients, such as, e.g., milk, sugar, starch, marshmallow root, kaolin, magnesium oxide, magnesium carbonate, diatomaceous earth and bentonite, can be used as a substitute for an equal amount of talcum in amounts of 1–10% (based on the weight of talcum) to provide proper form and consistency to the pressed cake. Such partial substitutions may be necessary when other substitutions or the additions described hereinafter are made in the formulas of the above examples, as every material has its cohesive and/or packing compressibility, to which the formula should be adapted in the case of substitutions or additions.

To the ingredients described in the formulas of the above examples, other ingredients, such as resorcin, resorcin monoacetate, sulfur, and benzoic acid may be added in amounts of 1.0–5.0% (based on the weight of the total composition) or they may be substituted for equal weights of the salicylic acid or allantoin. Other chlorinated phenols having germicidal or bactericidal properties may be used instead of hexochlorophene and other quaternary

| Ingredient | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|
| Talcum | 58.25 | 56.25 | 53.75 | 51.25 | 56.25 | 53.25 | 51.25 | 48.75 | 46.25 |
| Sodium lauryl sulfate | 0.75 | 0.75 | 0.75 | 0.75 | 0.75 | 0.75 | 0.75 | 0.75 | 0.75 |
| Titanium dioxide | 7.50 | 7.50 | 7.50 | 7.50 | 7.50 | 7.50 | 7.50 | 7.50 | 7.50 |
| Zinc stearate | 11.25 | 11.25 | 11.25 | 11.25 | 11.25 | 11.25 | 11.25 | 11.25 | 11.25 |
| Inorganic pigments, as required | 1.00 | 1.00 | 1.00 | 1.00 | 1.00 | 1.00 | 1.00 | 1.00 | 1.00 |
| Mineral oil | 4.50 | 4.50 | 4.50 | 4.50 | 4.50 | 4.50 | 4.50 | 4.50 | 4.50 |
| Spermaceti | 3.00 | 3.00 | 3.00 | 3.00 | 3.00 | 3.00 | 3.00 | 3.00 | 3.00 |
| Cetyl alcohol | 1.50 | 1.50 | 1.50 | 1.50 | 1.50 | 1.50 | 1.50 | 1.50 | 1.50 |
| Lanolin | 1.00 | 1.00 | 1.00 | 1.00 | 10.0 | 1.00 | 1.00 | 1.00 | 1.00 |
| Glycerin | 7.50 | 7.50 | 7.50 | 7.50 | 7.50 | 7.50 | 7.50 | 7.50 | 7.50 |
| Salicylic acid | 3.00 | 5.00 | 7.50 | 10.00 | | 3.00 | 5.00 | 7.50 | 10.00 |
| Allantoin | | | | | 5.00 | 5.00 | 5.00 | 5.00 | 5.00 |
| Hexachlorophene | 0.25 | 0.25 | 0.25 | 0.25 | 0.25 | 0.25 | 0.25 | 0.25 | 0.25 |
| Alkyl dimethyl benzyl ammonium chlorides, 50% | 0.20 | 0.20 | 0.20 | 0.20 | 0.20 | 0.20 | 0.20 | 0.20 | 0.20 |
| Methyl-para-hydroxy-benzoate | 0.09 | 0.09 | 0.09 | 0.09 | 0.09 | 0.09 | 0.09 | 0.09 | 0.09 |
| Propyl-para-hydroxy-benzoate | 0.09 | 0.09 | 0.09 | 0.09 | 0.09 | 0.09 | 0.09 | 0.09 | 0.09 |
| Perfume, as required | 0.12 | 0.12 | 0.12 | 0.12 | 0.12 | 0.12 | 0.12 | 0.12 | 0.12 |
| | 100 | 100 | 100 | 100 | 100 | 100 | 100 | 100 | 100 | ammonium compounds which have germicidal or bactericidal properties may be used in place of alkyl dimethyl benzyl ammonium chlorides. The methyl- and propyl-para-hydroxy benzoates can be partly or entirely substituted by other preservatives. The quantity and variety of pigments and perfume may be varied in order to obtain the desired characteristics. Antibiotics or sulfa drugs may also be added to the formulas of the above examples in amounts of 1–5% (based on the total weight of the composition) or they may replace part or all of the salicylic acid or allantoin.

The proportions of the ingredients shown in the above examples may somewhat vary and in this connection the following limits of deviations from the figures of the examples have been found to be acceptable:

| | Percent |
|---|---|
| Talcum | ±15 |
| Sodium lauryl sulfate | ±1 |
| Titanium dioxide | ±1 |
| Zinc stearate | ±10 |
| Mineral oil | ±10 |
| Spermaceti | ±10 |
| Cetyl alcohol | ±10 |
| Lanolin | ±10 |
| Glycerin | ±10 |
| Inorganic pigments | ±10 |
| Preserving and antiseptic agents | ±10 |

The above percent amounts are based on the weight of the respective individual ingredients.

As examples of mineral oil or petroleum products, refined liquid petrolatum and refined (odorless and tasteless) "white mineral oil" having a specific gravity of 0.835–0.845, and a Saybolt viscosity of 65/75 at 100° F., are mentioned. The lubricating materials mentioned in the above examples can be partly substituted up to 10% by, or mixed with additional amounts up to 10% of the following materials:

| | Substitute or addition |
|---|---|
| Mineral oil (petroleum product). | Robane, Squalene, isopropyl esters of fatty acids. |
| Spermaceti | Ceresin, ozokerite, paraffin, cetyl alcohol, microcrystalline waxes. |
| Cetyl alcohol | Stearyl alcohol, polyoxethylene derivatives of fatty acids, spermaceti. |
| Lanolin | Wool fat, hydrogenated fats or oils. |
| Glycerin | Propylene glycol, sorbitol, polyethylene glycol. |

It will be understood from the above that this invention is not limited to the specific ingredients, proportions, steps and other details specifically described above and can be carried out with various modifications without departing from the scope of the invention as defined in the appended claims.

The comminuter mentioned in the above Example 1 may be, for example, a conventional Fitzpatrick comminuter. The generation of heat in the final screening process is preferably prevented by short intermittent brushing of the material through the screen and, if desired, by air-cooling. The term "alkyl dimethyl benzyl ammonium chloride—50%" is used herein to denote a 50% by weight aqueous solution of this product. "Clarpic 80" is a varnish or lacquer product known in commerce under this name and is used in order to obtain a protective covering or coating. The term "materials having lubricating value" is used herein to denote materials which have lubricating properties in the usual sense and by their presence contribute to the formation of a pressed cake composition of satisfactory consistency and characteristics. In addition to the inorganic pigments mentioned above, other inorganic pigments, e.g. iron oxide pigments of red, yellow or umber color, and mixtures of two or more of such pigments can be used. The term "Robane" denotes the hydrocarbon hexamethyl tetracosane ($C_{30}H_{62}$). Instead of zinc stearate other insoluble, non-ionizing metal stearates, e.g. magnesium stearate or calcium stearate and, in addition to or instead of the above described metal oxides, other suitable metal oxide, e.g. magnesium oxide, can also be used, in the composition according to this invention. Instead of lanolin, modified lanolins and/or lanolin derivatives and instead of the wetting agents specifically mentioned above other conventional wetting agents can be used.

It will be understood from the above that according to our invention a compressed face powder cake of high quality is obtained, in which medicating materials of the above described type are compounded to a product which gives a highly satisfactory uniform cosmetic effect when applied to the skin, and, due to the particular composition of the products embodying this invention and to the presence of said medicating ingredients, exerts a beneficial effect on the healthy skin or on skin affected by acne, or similar conditions.

The term "preserving and antiseptic agents" is used herein to denote compounds or products having germicidal or bactericidal properties and some of these ingredients have also phagocytic or escharotic action. The term "cosmetically applicable" material or the like, is used herein to denote materials which meet cosmetic requirements, i.e. have no undesired side effect on human skin. The parts and percent stated herein are by weight if not otherwise stated.

What is claimed is:

1. A compressed face powder cake composition comprising in the form of a homogeneous mixture 45–65% by weight of talcum, containing a cosmetically applicable wetting agent, titanium dioxide, an insoluble metal stearate and an iron oxide pigment having a cosmetically suitable color in uniform distribution; said talcum being combined with 15 to 20% of cosmetically applicable lubricating materials to an intimate uniform mixture; a cosmetically applicable medical agent selected from the group consisting of salicylic acid, allantoin, hexachlorophene, and alkyl dimethyl benzyl ammonium chloride;

and cosmetically applicable preserving agents in the amount of 0.1 to 0.25% based on the weight of the total composition.

2. The compressed face powder cake composition of claim 1 wherein said medical agent is salicylic acid.

3. The compressed face powder cake composition of claim 1 wherein said medical agent is allantoin.

4. The compressed face powder cake composition of claim 1 wherein said medical agent is hexachlorophene.

5. A compressed face powder cake composition, comprising talcum in the amount of 46.25–61.25% with a tolerance of limits of about ±15%; a cosmetically applicable wetting agent in the amount of 0.75% with a tolerance of about ±1%; titanium dioxide in the amount of 7.50% with a tolerance af about ±1%; zinc stearate in the amount of 11.25% with a tolerance of about ±10%; iron oxide pigments having a cosmetically suitable color in the amount of 1.0% with a tolerance of about ±10%; cosmetically applicable lubricating ingredients in the amount of 17.50% with a tolerance of about ±10%; cosmetically applicable preserving, medicinal and antiseptic agents in the amount of 0.75 to 17.75% with a tolerance of the limits of about ±5% said medicinal agent being selected from the group consisting of salicylic acid, allantoin, hexachlorophene, and alkyl dimethyl benzyl ammonium chloride; the balance to 100% being perfume; the percent amounts of the various ingredients referring to the total weight of the composition and the percent amounts of the tolerances referring to the weight of the individual kind of the above ingredients.

6. A compressed face powder cake composition comprising in the form of a homogeneous mixture 45 to 65% by weight of talcum, further containing in uniform distribution a cosmetically applicable wetting agent, titanium dioxide, an insoluble metal stearate and an iron oxide pigment of cosmetically suitable color of the iron oxide type and having a cosmetically suitable color, said talcum being combined with 15 to 20% of cosmetically applicable lubricating materials to an intimate uniform mixture; a cosmetically applicable medical agent selected from the group consisting of salicylic acid, allantoin, hexachlorophene and alkyl dimethyl benzyl ammonium chloride; and cosmetically applicable preserving agents in the amount of 0.1 to 0.25% based on the weight of total composition.

7. The process of producing a compressed face powder composition containing a cosmetically applicable medicinal agent selected from the group consisting of salicylic acid, allantoin, hexachlorophene, and alkyl dimethyl benzyl ammonium chloride which comprises admixing powder ingredients of the composition including talcum and iron oxide pigment having a cosmetically suitable color, the medicinal agent and cosmetically applicable lubricating material to an intimate uniform mixture, and compressing the resulting mixture to face powder cake, the talcum being about 45–75% of said resulting mixture, the amount of lubricating material being about 15–20% of said resulting mixture, the production of the face powder composition being carried out in the substantial absence of water.

8. The process of claim 7, wherein the powders include a wetting agent, titanium dioxide, and an insoluble metal stearate.

9. The process of claim 8, wherein the wetting agent is used in amount of up to about 1.75% of the composition.

10. The process of claim 7, wherein the medicinal agent is salicylic acid.

11. The process of claim 7, wherein the medicinal agent is allantoin.

12. The process of claim 7 wherein the medicinal agent is hexachlorophene.

13. The process of producing a compressed face powder composition containing a cosmetically applicable medicinal agent selected from the group consisting of salicylic acid, allantoin, hexachlorophene, and alkyl dimethyl benzyl ammonium chloride which comprises admixing powder ingredients of the composition including talcum and iron oxide having a cosmetically suitable color with the medicinal agent, limiting the temperature during said mixing to less than about 37° C., adding to the admixture of powder and medicinal agent cosmetically applicable lubricating material in liquid state, blending the resulting lubricant-containing admixture and limiting the temperature during said mixing to less than about 37° C., and compressing the resulting mixture to face powder cake, the talcum being about 45–75% of said composition, the amount of lubricating material being about 15–20% of said composition, the production of the face powder being carried out in the substantial absence of water.

14. The process of claim 13, wherein the medicinal agent is salicyclic acid.

15. The process of claim 13, wherein the medicinal agent is allantoin.

16. The process of claim 13 wherein the medicinal agent is hexachlorophene.

References Cited by the Examiner

UNITED STATES PATENTS 2,562,488    7/1951    Fuchs _____ 167—92

OTHER REFERENCES

Adams et al.: Journal of Pharmacy and Pharmacology, vol. 10, No. 8, pp. 516–521, August 1958, 167–65 Chelate.

Chemical abstracts, vol. 43, entry 2536d, 1949 (citing Babko et al., Zhur. Obshchei Khim., vol. 18, No. 16, pp. 17–25, 1948).

Chemical abstracts, vol. 47, entry 1341f, 1953 (citing Muhr, Swiss Patent 276,557, Oct. 16, 1951).

Lesser: Drug and Cosmetic Industry, vol. 42, No. 4, pp. 452-3, April 1938.

Sagarin, Cosmetics: Science and Technology, published by Interscience Publishers, Inc., New York, 1957, pp. 222–240.

Trademark file for "Cosmedicake," Reg. No. 681,611, registered July 7, 1959.

Today's Health, vol. 42, No. 10, p. 6, October 1964.

LEWIS GOTTS, *Primary Examiner.*

FRANK CACCIAPAGLIA, JR., *Examiner.*

JULIAN S. LEVITT, RICHARD L. HUFF,
*Assistant Examiners.*